UNITED STATES PATENT OFFICE.

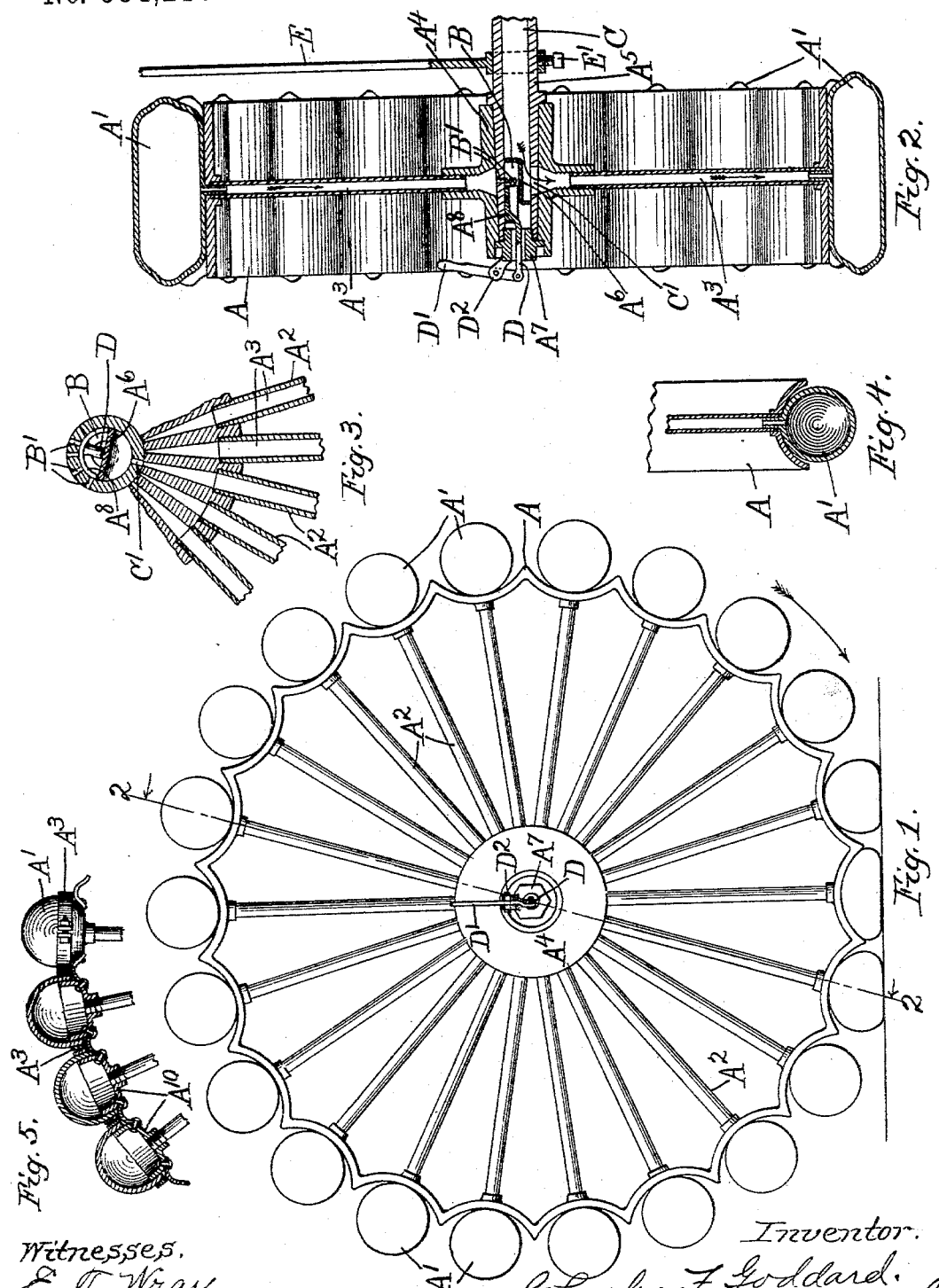

CHARLES F. GODDARD, OF CHICAGO, ILLINOIS, ASSIGNOR OF ONE-HALF TO SETH A. MINARD, OF SAME PLACE, AND WILLIAM S. STUCKENBERG, OF CINCINNATI, OHIO.

MOTOR WHEEL DEVICE.

SPECIFICATION forming part of Letters Patent No. 584,218, dated June 8, 1897.

Application filed July 31, 1896. Serial No. 601,152. (No model.)

*To all whom it may concern:*

Be it known that I, CHARLES F. GODDARD, a citizen of the United States, residing at Chicago, in the county of Cook and State of Illinois, have invented a new and useful Motor Wheel Device, of which the following is a specification.

My invention relates to motors, and particularly to such motors as are associated with a wheel, and has for its object to provide a new and improved self-propelling wheel.

My invention is illustrated in the accompanying drawings, wherein—

Figure 1 is a side view of a wheel embodying my invention. Fig. 2 is a section on line 2 2, Fig. 1. Fig. 3 is a section through the hub of the wheel in the plane of the spokes with parts omitted. Fig. 4 is a section through the rim and one of the spokes with parts omitted, showing a modification. Fig. 5 is a detail of a modification.

Like letters refer to like parts throughout the several figures.

The construction herein shown and described is particularly adapted to be used in connection with broad wheels—such, for example, as the traction-wheel of a threshing-machine or the like. The rim A of the wheel, instead of having an even outer surface, as is generally the case, is provided with a series of hollows or indentations. Each of these hollows or indentations is provided with a hollow flexible tube or bulb A', which is permanently fastened to the bottom thereof in any convenient manner, as by being cemented thereto. The rim of the wheel near the middle of each of these hollows or indentations is provided with an opening which connects with a passage-way leading to the hollow hub of the wheel. As shown in the drawings, these passage-ways are contained in the spokes $A^2$ of the wheel, but it is evident that they may be independent of said spokes, if desired. The bulbs or tubes A' are preferably shaped as shown and extend across the rim of the wheel, each bulb being connected with the opening in the rim at the bottom of the hollow in which it is placed, the passage-ways $A^3$ connecting the bulbs with the hub $A^4$ of the wheel. The axle $A^5$, upon which the wheel is journaled, is hollow and is divided by the partition $A^6$ into two apartments B and C. The apartment C is the admission-apartment and is adapted to be connected with a source of fluid-supply. The apartment B is the exhaust-apartment and is connected with the atmosphere. The admission-apartment is provided with an opening C', adapted to successively register with the passage-ways connecting the bulbs A' with the hub of the wheel. The exhaust-apartment is provided with a series of holes B' B', with which each of the passage-ways leading from the hub is adapted to successively register as the wheel is rotated. The axle $A^5$ is provided at its end with the plug or cap $A^7$. A movable controlling-plate $A^8$ is located in the apartment B and is associated with the openings B', so that it may be moved to vary their size. This plate is provided with an arm D, which projects through an opening in the cap $A^7$. A lever D' is connected with said arm and is pivotally connected to the projections $D^2$, connected with the cap $A^7$. It will be seen that by means of this lever the position of the plate $A^8$ may be varied, so as to vary the size of the exhaust-openings B' or so as to completely close them, if desired. Connected to the axle $A^5$ is a lever E, the axle being movable, so that its position may be varied by the movement of said lever. Said lever is connected with the axle by means of the set-screw E', so that its position with relation to said axle may be varied. Instead of having the bulbs A' of the shape shown in Figs. 1 and 2, I may make them round, as shown in Fig. 4.

I have described these several parts in detail, but it is evident that they may be varied in form, construction, and arrangement without departing from the spirit of my invention, and I therefore do not wish to be limited to the construction shown.

In Fig. 5 the part A' is secured about the bell-shaped part $A^{10}$ by clasp $A^3$.

The use and operation of my invention are as follows: When the apartment C in the axle of the wheel is connected with the source of fluid-supply, the fluid passes into the said apartment and by means of the opening C' enters one of the passage-ways A³ communicating with one of the bulbs A'. The axle A⁵ is preferably so positioned that the opening C' will be in communication with one of the bulbs when said bulb is a little to one side of the line through the hub and through the point of contact of the rim of said wheel with the ground. When said bulb is connected with the source of fluid-supply, it is expanded by the fluid and tends to lift the wheel, so as to cause it to rotate. As the wheel rotates the next bulb is brought into communication with the source of fluid-supply and the operation above described is repeated. The direction in which the wheel is rotated will depend upon the position of the hole C'. If said hole is on one side of the line connecting the hub of the wheel with the ground, said wheel will be rotated in one direction and if on the other side of such line the wheel will be rotated in an opposite direction. The position of this opening, and hence the direction of rotation of the wheel, is governed by the lever E. When any given passage-way has passed the opening C', the admission of fluid into such passage-way will be cut off, and as the wheel rotates said passage-way will be successively brought into communication with the exhaust-openings B' and the fluid will therefore be exhausted therefrom. By providing the exhaust-apartment with a series of holes and by providing a controlling device for said holes, so that their size may be regulated, I obtain an arrangement by which the exhaust will be gradual—that is, the fluid from any one bulb will be partially exhausted when the passage-way leading therefrom registers with the first exhaust-opening, the desired exhaustion only occurring after it has successively registered with a number of said openings. It will therefore be seen that a practically-noiseless exhaust may be obtained, which would not be the case if the bulbs were to be completely exhausted when first put in communication with the exhaust-apartment. The exhausting device is so arranged that the bulbs will not be completely exhausted, but will contain some fluid after they have passed all of the openings in the exhaust-apartment, and hence when they come in contact with the ground they will act as a cushioned tire, so as to hold the rim of the wheel away from the ground. When in this position they expand, completely filling the holes in the rim, as shown in Fig. 1.

It will be seen that I have here a motor-wheel provided on its periphery with a series of flexible bulbs independent of each other, the bulbs acting as a cushioned tire and also acting to propel the wheel.

I claim—

1. A motor device consisting of a wheel having a rim provided with a series of hollows or indentations, and a tire having a series of hollow unconnected flexible sections, a source of fluid-supply with which said flexible sections are successively connected, and a series of exhaust-openings with which said flexible sections are connected after being connected with the source of fluid-supply.

2. A motor device consisting of a wheel having a tire consisting of a series of hollow unconnected flexible sections, a source of fluid-supply with which said flexible sections are successively connected, and a series of exhaust-openings with which said flexible sections are connected after being connected with the source of fluid-supply, and a controlling device for said exhaust-openings by which their size may be varied, whereby a gradual but incomplete exhaust is obtained substantially as described.

3. A motor device consisting of a wheel having a rim provided with a series of hollows or indentations, and a tire having a series of hollow unconnected flexible sections, a source of fluid-supply with which said flexible sections are successively connected, and a series of exhaust-openings with which said flexible sections are connected after being connected with the source of fluid-supply, and a controlling device for said exhaust-openings by which their size may be varied whereby a gradual but incomplete exhaust is obtained, substantially as described.

4. A wheel comprising a rim provided with a series of hollows or indentations, a series of hollow flexible bulbs fitting into said hollows or indentations and connected with the rim of the wheel, a passage-way in communication with said bulbs and leading to the hollow hub of the wheel, an axle upon which said wheel is mounted provided with exhaust and admission apartments separate from each other, the admission-apartment adapted to be connected with a source of fluid-supply and the exhaust-apartment adapted to be connected with the atmosphere, said admission-apartment provided with an opening adapted to successively register with the passage-ways leading to the bulbs as the wheel is rotated, said exhaust-apartment provided with a series of openings with which each passage-way is adapted to successively register.

5. A wheel comprising a rim provided with a series of hollows or indentations, a series of hollow flexible bulbs fitting into said hollows or indentations and connected with the rim of the wheel, a passage-way in communication with said bulbs and leading to the hollow hub of the wheel, an axle upon which said wheel is mounted provided with exhaust and admission apartments separate from each other, the admission-apartment adapted to be connected with a source of fluid-supply and the exhaust-apartment adapted to be connected with the atmosphere, said admission-apartment provided with an opening adapted to successively register with the passage-ways leading to the bulbs as the wheel is rotated, said exhaust-apartment provided with a series of openings with which each passage-way is adapted to successively register, and a controlling device by which their size may be varied.

6. A wheel comprising a rim provided with a series of hollows or indentations, a series of hollow flexible bulbs fitting into said hollows or indentations and connected with the rim of the wheel, a passage-way in communication with said bulbs and leading to the hollow hub of the wheel, an axle upon which said wheel is mounted provided with exhaust and admission apartments separate from each other, the admission-apartment adapted to be connected with a source of fluid-supply and the exhaust-apartment adapted to be connected with the atmosphere, said admission-apartment provided with an opening adapted to successively register with the passage-ways leading to the bulbs as the wheel is rotated, said exhaust-apartment provided with a series of openings with which each passage-way is adapted to successively register, a movable plate associated with said exhaust-openings and adapted to be moved so as to vary their size, and a controlling device for said plate by which its position may be varied.

7. A motor device consisting of a wheel having a series of radially-movable parts associated with its periphery, said parts adapted to be moved so as to be radially extended by means of a fluid under pressure, a source of fluid-supply with which said movable devices are successively operatively connected, a series of exhaust-openings adapted to be placed in communication with said movable parts, and a controlling device for said exhaust-openings by which their size may be varied and a gradual but incomplete exhaust may be obtained, substantially as described.

Chicago, Illinois, July 21, 1896.

CHARLES F. GODDARD.

Witnesses:
FRANCIS M. IRELAND,
DONALD M. CARTER.